United States Patent
Tanaka et al.

(10) Patent No.: US 6,593,419 B2
(45) Date of Patent: Jul. 15, 2003

(54) POLYURETHANE RESIN AND METHOD FOR PRODUCING THE SAME, RESIN COMPOSITION AND SHEET-FORM ARTICLE

(75) Inventors: Hiroki Tanaka, Osaka-fu (JP); Shigetoki Nishino, Osaka-fu (JP); Hideyuki Takeuchi, Osaka-fu (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/973,738

(22) Filed: Oct. 11, 2001

(65) Prior Publication Data

US 2003/0092832 A1 May 15, 2003

(51) Int. Cl.[7] .............................. C08J 3/00; C08K 3/20; C08L 75/00; B32B 27/00; B32B 27/40
(52) U.S. Cl. ..................... 524/589; 428/423.1; 524/590; 528/44
(58) Field of Search ................................ 524/589, 590; 528/44; 428/423.1

(56) References Cited

U.S. PATENT DOCUMENTS 5,494,990 A * 2/1996 Tagawa et al.

FOREIGN PATENT DOCUMENTS

| JP | 4-114025 | * | 4/1992 |
| JP | 4-308280 | * | 10/1992 |

* cited by examiner

*Primary Examiner*—Patrick D. Niland
(74) *Attorney, Agent, or Firm*—Armstrong, Westerman & Hattori, LLP

(57) ABSTRACT

A method for producing a polyurethane resin which comprises reacting: (A) a compound having an active hydrogen-containing group, containing: (A1) a compound having one spiro ring and active hydrogen-containing groups at both ends; and (A2) an aliphatic polycarbonate polyol; (B) a polyisocyanate; and (C) a chain-extending agent. Also disclosed are a resin composition comprising the polyurethane resin and a sheet-form article comprising the poylurethane resin or the resin composition.

10 Claims, No Drawings

POLYURETHANE RESIN AND METHOD FOR PRODUCING THE SAME, RESIN COMPOSITION AND SHEET-FORM ARTICLE

FIELD OF THE INVENTION

The present invention relates to a method for producing a polyurethane resin which forms a sheet-form article such as a synthetic leather, an artificial leather, a film, a sheet form article such as a sheet for molding, or a surface of the sheet-form article excellent in dry touch property and oleic acid-resistance. The present invention also relates to a sheet-form article.

BACKGROUND OF THE INVENTION

Heretofore, polyurethane resins have been widely used for sheet-form articles such as synthetic leathers, artificial leathers, films, or sheets for molding or surface treatment of the sheet-form articles. In theses field, various feel is required for the sheet-form articles when they are touched, together with higher durability. Particularly, in the uses for wheeled vehicles and the like in which a high performance is required, a polyurethane resin having both of dry touch property and oleic acid-resistance has been desired.

Dry touch property means a feel free from so-called wet touch when a sheet-form article is touched. Hitherto, for example, a method of blending a polyurethane resin with a hard polymer or a technique for enhancing crystallinity of a polyurethane resin have been employed but these method and technique result in a defect that flexural resistance and a soft feel of a sheet-form article thereof are deteriorated.

Moreover, oleic acid-resistance is a substitute property for the durability against human sweat which comes into contact with a sheet-form article. Hitherto, so-called yellowing or hardly yellowing polyurethane resins wherein aromatic isocyanates are used have exhibited relatively satisfactory oleic acid-resistance but there is a problem of poor discoloring resistance. On the other hand, so-called yellowing-free polyurethane resins wherein aliphatic isocyanates are used are excellent in discoloring resistance but it is difficult to attain satisfactory oleic acid-resistance.

SUMMARY OF THE INVENTION

An object of the invention is to provide a method for producing a polyurethane resin excellent in discoloring resistance and also having both of dry touch property and oleic acid-resistance, which is hitherto difficult to obtain.

Another object of the present invention is to provide a resin composition comprising the polyurethane resin.

A still other object of the present invention is to provide a sheet-form article comprising the polyurethane resin.

Other objects and effects of the present invention will become apparent from the following description.

As a result of extensive studies, the present inventors have found that the above problem can be solved by using, as components of a compound having an active hydrogen-containing group, (A1) a compound having one spiro ring and active hydrogen-containing groups at both ends and (A2) an aliphatic polycarbonate polyol, and thus, have accomplished the invention.

Namely, the invention provides a method for producing a polyurethane resin which comprises reacting: (A) a compound having an active hydrogen-containing group, containing (A1) a compound having one spiro ring and active hydrogen-containing groups at both ends and (A2) an aliphatic polycarbonate polyol; (B) a polyisocyanate; and (C) a chain-extending agent, preferably a diamine compound.

The present invention also provides a polyurethane resin composition comprising the polyurethane resin.

Furthermore, the present invention also provides a sheet-form article comprising the resin or the resin composition.

In a preferred embodiment, the content of said compound (A1) is from 0.2 to 40% by weight relative to the polyurethane resin.

In another preferred embodiment, said compound is 3,9-bis(1,1-dimethyl-2-hydroxyethyl)-2,4,8,10-tetraoxaspriro[5.5]undecane.

DETAILED DESCRIPTION OF THE INVENTION

As the compound (A1) having one spiro ring and active hydrogen-containing groups at both ends, a glycol, a diamine, or the like represented by the following formula (1) is mentioned.

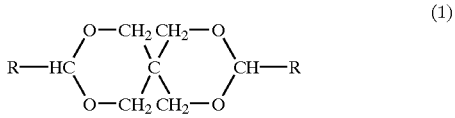

(wherein R represents an active hydrogen-containing alkyl group)

Specific examples of the glycol include 3,9-bis(1,1-dimethyl-2-hydroxyethyl)-2,4,8,10-tetraoxaspriro[5.5]undecane, 3,9-bis(2-hydroxyethyl)-2,4,8,10-tetraoxaspriro[5.5]undecane, 3,9-bis(1-methyl-2-hydroxyethyl)-2,4,8,10-tetraoxaspriro[5.5]undecane, 3,9-bis(1-ethyl-2-hydroxyethyl)-2,4,8,10-tetraoxaspriro[5.5]undecane, 3,9-bis(1-ethyl-1-methyl-2-hydroxyethyl)-2,4,8,10-tetraoxaspriro[5.5]undecane, 3,9-bis(2-hydroxyethyl-2-methyl)-2,4,8,10-tetraoxaspriro[5.5]undecane, 3,9-bis(1-methyl-2-hydroxy-2-methylethyl)-2,4,8,10-tetraoxaspriro[5.5]undecane, 3,9-bis(1-ethyl-2-hydroxy-2-methylethyl)-2,4,8,10-tetraoxaspriro[5.5]undecane, 3,9-bis(1,1-dimethyl-2-hydroxy-2-methoxyethyl)-2,4,8,10-tetraoxaspriro[5.5]undecane, 3,9-bis(1-ethyl-1-methyl-2-hydroxy-2-methylethyl)-2,4,8,10-tetraoxaspriro[5.5]undecane, and 3,9-bis(2-hydroxypropyl)-2,4,8,10-tetraoxaspriro[5.5]undecane.

Examples of the diamine include 3,9-bis(1,1-dimethyl-2-aminoethyl)-2,4,8,10-tetraoxaspriro[5.5]undecane, 3,9-bis(2-aminoethyl)-2,4,8,10-tetraoxaspriro[5.5]undecane, 3,9-bis(1-methyl-2-aminoethyl)-2,4,8,10-tetraoxaspriro[5.5]undecane, 3,9-bis(1-ethyl-2-aminoethyl)-2,4,8,10-tetraoxaspriro[5.5]undecane, 3,9-bis(1-ethyl-1-methyl-2-aminoethyl)-2,4,8,10-tetraoxaspriro[5.5]undecane, 3,9-bis(2-aminoethyl-2-methyl)-2,4,8,10-tetraoxaspriro[5.5]undecane, 3,9-bis(1-methyl-2-amino-2-methylethyl)-2,4,8,10-tetraoxaspriro[5.5]undecane, 3,9-bis(1-ethyl-2-amino-2-methylethyl)-2,4,8,10-tetraoxaspriro[5.5]undecane, 3,9-bis(1,1-dimethyl-2-amino-2-methylethyl)-2,4,8,10-tetraoxaspriro[5.5]undecane, 3,9-bis(1-ethyl-1-methyl-2-amino-2-methylethyl)-2,4,8,10-tetraoxaspriro[5.5]undecane, 3,9bis(2-aminopropyl)-2,4,8,10-tetraoxaspriro[5.5]undecane and the like. Among these active hydrogen-containing group-having compounds, preferred is 3,9-bis(1,1-dimethyl-2-hydroxyethyl)-2,4,8,10-tetraoxaspriro[5.5]undecane.

The content of the compound (A1) having a spiro ring and active hydrogen-containing groups at both ends, in the polyurethane resin is preferably from 0.2 to 40% by weight, and the content of such a range can result in excellent dry tough property and solution stability. The most preferred content is from 0.5 to 35% by weight.

The aliphatic polycarbonate polyol (A2) for use in the invention has a constituting unit represented by the following formula (2).

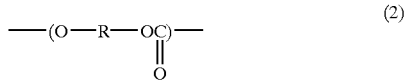

(wherein R represents an aliphatic alkylene group, preferably an aliphatic alkylene group having 4 to 20 carbon atoms, more preferably an aliphatic alkylene group having 4 to 9 atoms. Particularly preferred carbon number of the R groups in the aliphatic alkylene groups is 4 alone or a combination of 4 and 6.

For the production of the aliphatic polycarbonate polyol for use in the invention, a glycol is used as a starting material. Examples of the glycol having an aliphatic alkylene group which satisfies the requirement of the aliphatic alkylene group (R) in the constituting unit (formula (2)) of the aliphatic polycarbonate polyol (A2) in the active hydrogen-containing group-having compound of the invention include 1,4-butanediol, 1,5-pentanediol, 1,6-hexanediol, 1,7-heptanediol, 1,8-octanediol, 1,9-nonanediol, 2-ethyl-1,6-hexanediol, 3-methyl-1,5-pentanediol, neopentyl glycol, 2-methyl-1,8-octanediol, 2,4-diethyl-1,5-pentanediol, 1,3-cyclohexanediol, 2,2'-bis(4-hydroxycyclohexyl)propane, 1,4-dimethylolcyclohexane, dipropylene glycol, polytetramethylene glycol, 2,6'-dihydroxyethyl hexyl ether, 2,4'-dihydroxyethyl butyl ether, 2,5'-dihydroxyethyl pentyl ether, 2,3'-dihydroxy-2,2'-dimethylpropyl ether, 2,2-diethyl-1,3-propanediol, 2-butyl-2-ethyl-1,3-propanediol, 2-pentyl-2-propyl-1,3-propanediol, 2-butyl-2-hexyl-1,3-propnaediol, 2-ethyl-1,3-hexanediol, diethylene glycol, triethylene glycol, tetraethylene glycol, polyethylene glycol (molecular weight: 300 to 6000), tripropylene glycol, 2-butyl-2-hexyl-1,3-propanediol, bishydroxyethoxybenzene, bisphenol A, hydrogenated bisphenol A, hydroquinone, alkylene oxide adducts thereof, and the like, One or more glycols selected from these glycols may be used.

As the glycols, preferred are aliphatic glycols having 4 to 9 carbon atoms, and examples thereof include 1,4-butanediol, 1,5-pentanediol, 1,6-hexanediol, 1,7-heptanediol, 1,8-octanediol, 1,9-nonanediol, 3-methyl-1,5-pentanediol, neopentyl glycol, 2-methyl-1,8-octanediol, 2,4-diethyl-1,5-pentanediol, 2-butyl-2-ethyl-1,3-propanediol, and diol isomers thereof. Particularly preferred is 1,4-butanediol alone or a mixture of 1,4-butanediol and 1,6-hexanediol.

As the polyisocyanate compound (B) for use as a starting material of the polyurethane resin of the invention, preferably used is an aliphatic and/or alicyclic polyisocyanate compound, and examples thereof include tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, 1,3- or 1,4-bis-(isocyanatomethyl)-cyclohexane, hydrogenated xylylene diisocyanate, lysine diisocyanate, isophorone diisocyanate, 4,4'-dicyclohexylmethane diisocyanate, 2- or 4-isocyanatocyclohexyl-2'-isocyanatocyclohexylmethane, 3,3'-dimethyl-4,4'-dicyclohexylmethane diisocyanate, 2,5(2,6)-bis(isocyanato)methylbicyclo[2.2.1]heptane, and the like. These compounds may be used singly or in combination.

A polyisocyanate compound other than the above polyisocyanate compound may be used in combination unless the effects of the invention are deteriorated. Examples of the former compound include 2,4-tolylene diisocyanate, 2,6-tolylene diisocyanate, m-phenylene diisocyante, p-phenylene diisocyanate, 4,4'-diphenylmethane diisocyanate, 2,4'-diphenylmethane diisocyanate, 2,3'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate, tetramethylxylylene diisocyanate, and the like.

Furthermore, a polyol (A3) other than the above polycarbonate polyol may be used in combination with the polycarbonate polyol (A2) for use in the invention depending on the use of the polyurethane resin unless the effects of the invention are deteriorated. Examples of such polyol include, as polyester, dehydrative condensation products of glycol components such as ethylene glycol, 1,2-propylene glycol, 1,3-propylene glycol, 1,3-butylene glycol, 1,4-butylene glycol, 2,2-dimethyl-1,3-propanediol, and the like in addition to the glycols for use as the staring material for the production of the above aliphatic polycarbonate polyol and the glycols having a spiro ring, with acid components such as succinic acid, maleic acid, adipic acid, glutaric acid, pimelic acid, suberic acid, azelaic acid, sebacic acid, dodecanedioic acid, maleic anhydride, fumaric acid, hexahydroisophthalic acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and acid anhydrides or ester-forming derivatives of these dicarboxylic acids; p-hydroxybenzoic acid, p-(2-hydroxyethoxy)benzoic acid, and ester-forming derivatives of these hydroxycarboxylic acids; or the like. In addition, polyesters and copolymeric polyesters obtainable by the ring-opening polymerization of cyclic esters such as γ-butyrolactone and ε-caprolactone using the above glycols as initiators may be mentioned. As polyether polyols, there may be mentioned homopolymers or copolymers obtainable by the ring-opening polymerization of ethylene oxide, propylene oxide, butylene oxide, and styrene oxide. Also mentioned is the ring-opening polymerization product of tetrahydrofuran. In addition, aromatic polycarbonate polyols, polyacetal polyols, polyacrylate polyols, polyesteramide polyols, polythioether polyols, and the like may be mentioned.

The chain-extending agent (C) for use in the invention contains preferably a diamine compound as an essential component, and specific examples of the agent include, in addition to the glycols described in the paragraph of the polyester polyols, polyhydroxy compounds such as glycerol, trimethylolethane, trimethylolpropane, sorbitol, and pentaerythritol; polyamine compounds including diamines such as ethylenediamine, 1,2-propanediamine, 1,3-propanediamine, 1,6-hexamethylenediamine, piperazine, 2-methylpiperazine, 2,5-dimethylpiperazine, N,N'-diaminopiperazine, isophoronediamine, 4,4'-diaminodicyclohexylmethane, 3,3'-dimethyl-4,4'-diaminodicyclohexylmethane, 1,2-cyclohexanediamine, 1,4-cyclohexanediamine, aminoethylethanolamine, aminopropylethanolamine, aminohexylethanolamine, aminoethylpropanolamine, aminopropylpropanolamine, and aminohexylpropanolamine; polyamines such as diethylenetriamine, dipropylenetriamine, and triethylenetetramine; hydrazines; acid hydrazides; and the like. These compounds may be used solely or in combination.

The amount of the polyisocyanate compound (B) for use in the invention is preferably from 0.9 to 1.1 equivalents when the amount of total active hydrogen of the above (A1), (A2), other polyol (A3), and the chain-extending agent (C) is determined as 1 equivalent.

The above components (A), (B), (A3) and (C) can be reacted in accordance with a hitherto known method. For example, the reaction may be carried out without solvent or in an organic solvent or in water at a reaction temperature of 30 to 250° C. Preferably, the reaction is carried out in a solvent.

In the case of the solution reaction, an organic solvent, e.g., an aromatic hydrocarbon such as toluene or xylene; a ketone such as acetone, methyl ethyl ketone, or cyclohexanone; an ether such as tetrahydrofuran; an acetate ester such as ethyl acetate or butyl acetate; an amide such as dimethylformamide or 1-methyl-2-pyrrolidone; isopropanol, cellosolve, cellosolve acetate, or the like, may be added at any stage of the beginning of the reaction, the midst of the reaction, and the end of the reaction. The resin composition of the invention is preferably a polyurethane resin solution in a solvent.

At the production of the polyurethane resin of the invention, a monoalcohol, an alcohol having three or more functional groups, an organic monoamine, an amine having three or more functional groups, an organic monoisocyanate, or a polyisocyanate having three or more functional groups may be used, if necessary.

At the production of the polyurethane resin of the invention, a catalyst or a stabilizer may be used, if necessary. These catalyst and stabilizer may be added at any stage.

Examples of the catalyst include nitrogen-containing compound such as triethylamine, triethylenediamine, and morpholine; metal salts such as potassium acetate, zinc stearate, and tin octylate; organometallic compounds such as dibutyltin dilaurate; and the like.

As the stabilizer, a stabilizer to ultraviolet ray such as a substituted benzotriazole, a stabilizer to thermal oxidation such as a phenol derivative, or the like may be added.

The polyurethane resin of the invention is preferably obtained as a resin solution, and the number-average molecular weight measured on GPC is preferably from 5000 to 1000000, By the way, according to the method for producing a polyurethane resin of the invention, a polyurethane resin having a molecular weight out of the above number-average molecular weight range can be obtained, and the polyurethane resin may be used for various uses as far as the resin achieves the effects of the invention.

Other than the above catalyst and stabilizer, additives such as an other resin, an antioxidant, an ultraviolet absorber, a hydrolysis inhibitor, a pigment, a dye, a fire retardant, a filler, and a crosslinking agent may be incorporated, if necessary, into the polyurethane resin or the resin solution obtainable according to the invention.

Examples of the other resin include polyurethane resins other than those of the invention, poly(meth)acrylic resins, vinyl chloride-vinyl acetate copolymers, vinyl chloride-vinyl propionate copolymers, polyvinylbutyral resin, cellulose-type resins, polyester resins, epoxy resins and phenoxy resins, polyamide resins, and the like.

Examples of the crosslinking agent include the above-described organic polyisocyanates, and the like.

A sheet-form article can be formed using the above polyurethane resin or resin composition. At the production of such a sheet-form article, a hitherto known method can be applied to the production depending on the purpose to be used and the method for the production is not particularly limited. Examples thereof include a sheet-form article of a urethane resin film produced from a polyurethane resin solution in a solvent through a wet film-forming process, which is adhered onto one of various base materials such as woven fabrics and non-woven fabrics or without base material; a sheet-form article obtainable by coating one of sheet-form articles formed by various methods with a polyurethane resin solution of the invention through gravure printing, spraying or the like a sheet-form article obtainable by laminating a sheet-form article produced from the polyurethane resin and a sheet-form article prepared by one of other various methods; and the like. Either fine porous polyurethane resin film or non-porous one may be used.

The sheet-form article of the invention means a synthetic leather, an artificial leather, a film, or a sheet for molding, or the like prepared using the polyurethane resin of the invention or its composition. The thickness of the resin film of the sheet-form article is preferably from 0.001 to 3 mm.

In the invention, a compound having one spiro ring and active hydrogen-containing groups at both ends (A1) and an aliphatic polycarbonate polyol (A2) are used, whereby a polyurethane resin excellent in dry touch property and oleic acid-resistance is obtained. Accordingly, it is possible to apply the resin to the uses which require both of dry touch and durability as a sheet-form article such as a synthetic leather, an artificial leather, a film, or a sheet for molding or as a surface layer obtainable by coating the surface of such a sheet-form article.

EXAMPLES

The present invention will be illustrated in greater detail with reference to the following Examples, but the invention should not be construed as being limited thereto. In the following Examples, all the "parts(s)" and given by weight unless otherwise indicated.

SYNTHESIS EXAMPLE 1

To 640 parts of dimethylforamide (DMF) were added 100 parts of poly(1,6-hexane carbonate diol) having an average molecular weight of 2000, 5 parts of 3,9-bis(1,1-dimethyl-2-hydroxyethyl)-2,4,8,10-tetraoxaspriro[5.5]undecane (SPG), and 40 parts 4,4'-dicyclohexylmethane diisocyanate (hydrogenated MDI), and the whole was reacted at 80° C. for 3 hours. Then, 15 parts of isophoronediamine (IPDA) was added thereto at 25° C. and reacted to obtain a polyurethane resin solution a having a solid content of 20%, a viscosity of 200 dPa.s, and a number-average molecular weight of 60000.

SYNTHESIS EXAMPLE 2

To 683 parts of DMF were added 100 parts of poly(1,6-hexane carbonate diol) having an average molecular weight of 2000, 30 parts of SPG, and 40 parts of hydrogenated MDI, and the whole was reacted at 80° C. for 3 hours. Then, 0.7 part of IPDA was added thereto at 25° C. and reacted to obtain a polyurethane resin solution b having a solid content of 20%, a viscosity of 300 dPa.s, and a number-average molecular weight of 65000.

SYNTHESIS EXAMPLE 3

To 683 parts of DMF were added 100 parts of a copolycarbonate diol having a average molecular weight of 2000 wherein the glycol component is 1,4-butanediol/1,6-hexanediol=90/10 (molar ratio), 30 parts of SPG, and 40 parts of hydrogenated MDI, and the whole was reacted at 80° C. for 3 hours. Then, 0.7 part of IPDA was added thereto at 25° C. and reacted to obtain a polyurethane resin solution c having a solid content of 20%, a viscosity of 300 dPa.s, and a number-average molecular weight of 67000.

SYNTHESIS EXAMPLE 4

To 560 parts of DMF were added 100 parts of poly(1,6-hexane carbonate diol) having an average molecular weight of 2000, 20 parts of SPG, and 20 parts of 1,6-hexamethylene diisocyanate (HDI), and the whole was reacted at 80° C. for 5 hours to obtain a polyurethane resin solution d having a solid content of 20%, a viscosity of 200 dPa.s, and a number-average molecular weight of 57000.

COMPARATIVE SYNTHESIS EXAMPLE 1

To 639 parts of DMF were added 100 parts of polytetramethylene glycol having an average molecular weight of 2000, 5 parts of SPG, and 40 parts of hydrogenated MDI, and the whole was reacted at 80° C. for 3 hours. Then, 15 parts of IPDA was added thereto at 25° C. and reacted to obtain a polyurethane resin solution e having a solid content of 20%, a viscosity of 200 dPa.s, and a number-average molecular weight of 68000.

COMPARATIVE SYNTHESIS EXAMPLE 2

To 630 parts of DMF were added 100 parts of poly(1,6-hexane carbonate diol) having an average molecular weight of 2000 and 40 parts of hydrogenated MDI, and the whole was reacted at 80° C. for 3 hours. Then, 17.5 parts of IPDA was added thereto at 25° C. and reacted to obtain a polyurethane resin solution f having a solid content of 20%, a viscosity of 150 dPa.s, and a number-average molecular weight of 51000.

REFERENCE EXAMPLE

Production of Base Material for Polyurethane Sheet

A woven fabric was coated at a clearance of 1 mm with a mixed solution of 100 parts of CRISVON MP-120 (a solution compared of a polyurethane resin having no spiro ring, manufactured by Dainippon Ink & Chemicals, Incorporated), 2 parts of CRISVON ASSISTOR SD-7 (an auxiliary agent for film-forming, manufactured by Dainippon Ink & Chemicals, Incorporated), 2 parts of CRISVON ADDITIVE No. 10 (an auxiliary agent for film-forming, manufactured by Dainippon Ink & Chemicals, Incorporated), and 100 parts of DMF. Then, the coated fabric was immersed in 10% aqueous DMF solution, washed and dried to obtain a sheet-form article a having porous film at the surface.

EXAMPLE 1

A polyester film was coated with the polyurethane resin solution a obtained in Synthetic Example 1, and the coated film was dried at 120° C. for 5 minutes to obtain a transparent coating a having a thickness of 45 µm.

EXAMPLE 2

A polyester film was coated with the polyurethane resin solution b obtained in Synthetic Example 2, and the coated film was dried at 120° C. for 5 minutes to obtain a transparent coating b having a thickness of 45 µm.

EXAMPLE 3

A polyester film was coated with the polyurethane resin solution c obtained in Synthetic Example 3, and the coated film was dried at 120° C. for 5 minutes to obtain a transparent coating c having a thickness of 45 µm.

EXAMPLE 4

A polyester film was coated with the polyurethane resin solution d obtained in Synthetic Example 4, and the coated film was dried at 120° C. for 5 minutes to obtain a transparent coating d having a thickness of 45 µm.

EXAMPLE 5

A release power was coated with a mixed solution composed of 100 parts of the polyurethane resin solution a obtained in Synthetic Example 1, 50 parts of DMF, and 20 parts of DILAC Blue L-1779S (a colorant manufactured by Dainippon Ink & Chemicals, Incorporated) to obtain a dried coating A having a thickness of 25 µm. Then, the porous surface of the polyurethane sheet-form article a obtained in Reference Example and the dried coating A were overlapped each other and fixed by applying pressure under heating to obtain a sheet-form article b having a thickness of 1.5 mm.

EXAMPLE 6

A release paper was coated with a mixed solution composed of 100 parts of the polyurethane resin solution b obtained in Synthetic Example 2, 50 parts of DMF, and 20 parts of DILAC Blue L-1779S to obtain a dried coating B having a thickness of 25 µm. Then, the porous surface of the sheet-form article a obtained in Reference Example and the dried coating B were overlapped each other and fixed by applying pressure under heating to obtain a sheet-form article c having a thickness of 1.5 mm.

EXAMPLE 7

A release paper was coated with a mixed solution composed of 100 parts of the polyurethane resin solution c obtained in Synthetic Example 3, 50 parts of DMF, and 20 parts of DILAC Blue L-1779S to obtain a dried coating C having a thickness of 25 µm. Then, the porous surface of the sheet-form article a obtained in Reference Example and the dried coating C were overlapped each other and fixed by applying pressure under heating to obtain a sheet-form article d having a thickness of 1.5 mm.

EXAMPLE 8

A release paper was coated with a mixed solution composed of 100 parts of the polyurethane resin solution d obtained in Synthetic Example 4, 50 parts of DMF, and 20 parts of DILAC Blue L-1779S to obtain a dried coating D having a thickness of 25 µm. Then, the porous surface of the sheet-form article a obtained in Reference Example and the dried coating D were overlapped each other and fixed by applying pressure under heating to obtain a sheet-form article e having a thickness of 1.5 mm.

COMPARATIVE EXAMPLE 1

A polyester film was coated with the polyurethane resin solution e obtained in Comparative Synthetic Example 1, and the coated film was dried at 120° C. for 5 minutes to obtain a transparent coating e having a thickness of 45 µm.

COMPARATIVE EXAMPLE 2

A polyester film was coated with the polyurethane resin solution f obtained in Comparative Synthetic Example 2, and the coated film was dried at 120° C. for 5 minutes to obtain a transparent coating f having a thickness of 45 μm.

COMPARATIVE EXAMPLE 3

A release paper was coated with a mixed solution composed of 100 parts of the polyurethane resin solution e obtained in Comparative Synthetic Example 1, 50 parts of DMF, and 20 parts of DILAC Blue L-1779S to obtain a dried coating E having a thickness of 25 μm. Then, the porous surface of the sheet-form article a obtained in Reference Example and the dried coating E were overlapped each other and fixed by applying pressure under heating to obtain a sheet-form article f having a thickness of 1.5 mm.

COMPARATIVE EXAMPLE 4

A release paper was coated with a mixed solution composed of 100 parts of the polyurethane resin solution f obtained in Comparative Synthetic Example 2, 50 parts of DMF, and 20 parts of DILAC Blue L-1779S to obtain a dried coating F having a thickness of 25 μm. Then, the porous surface of the sheet-form article a obtained in Reference Example and the dried coating F were overlapped each other and fixed by applying pressure under heating to obtain a sheet-form article g having a thickness of 1.5 mm.

COMPARATIVE EXAMPLE 5

To 1366 parts of DMF were added 100 parts of 1,6-hexane carbonate diol having an average molecular weight of 2000, 150 parts of SPG, and 91.5 parts of HDI, and the whole was reacted at 80° C. for 5 hours to obtain a polyurethane resin solution g which is not flowable at room temperature.

PERFORMANCE EVALUATION

Oleic acid-resistance and surface touch property were evaluated by the following each method.

Oleic Acid-Resistance

A transparent coating or a sheet-form article was immersed in oleic acid at 70° C. for 24 hours. Thereafter, breaking strength (MPa) was measured, or surface state after 20 times of wiping of the surface with a dry cotton cloth was observed.

Surface Touch Property

The surface of a sheet-form article was evaluated through touching the surface.

The evaluation was carried out according to five ranks, wet state being "1" and dry state being "5".

TABLE 1

Results of Performance Evaluation

|  | Example 1 | Example 2 | Example 3 | Example 4 | Comparative Example 1 | Comparative Example 2 | Comparative Example 3 |
|---|---|---|---|---|---|---|---|
| Initial breaking strength (MPa) | 49 | 51 | 51 | 48 | 48 | 49 | *1) |
| After oleic acid test (MPa) | 27 | 30 | 32 | 31 | dissolved | 19 | *1) |

*1) Evaluation was impossible because the polyurethane resin solution g was not flowable.

TABLE 2

Results of Performance Evaluation

|  | Example 5 | Example 6 | Example 7 | Example 8 | Comparative Example 3 | Comparative Example 4 |
|---|---|---|---|---|---|---|
| Surface touch property | 4–5 | 5 | 5 | 5 | 4 | 2 |
| Surface state after oleic acid test | no decoloring | no decoloring | no decoloring | no decoloring | coating was dissolved | slight decoloring |

Surface touch property Wet state was ranked as "1" and dry state was ranked as "5".

According to the invention, a polyurethane resin excellent in both of dry touch property and oleic acid-resistance and a composition thereof are obtained, and a sheet-form article thereof is excellent in dry touch and durability.

While the invention has been described in detail and with reference to specific examples thereof, it will be apparent to one skilled in the art that various changes and modifications can be made therein without departing from the spirit and scope thereof.

What is claimed is:

1. A method for producing a polyurethane resin which comprises reacting:
   (A) a compound having an active hydrogen-containing group, containing: (A1) a compound having one spiro ring and active hydrogen-containing groups at both ends; and (A2) an aliphatic polycarbonate polyol;
   (B) an aliphatic and/or alicyclic polyisocyanate; and
   (C) a chain-extending agent.

2. The method for producing a polyurethane resin according to claim 1, wherein the reaction is carried out so that the content of said compound (A1) becomes from 0.2 to 40% by weight in the polyurethane resin.

3. The method for producing a polyurethane resin according to claim 1, wherein said chain-extending agent (C) is a diamine compound.

4. The method for producing a polyurethane resin according to claim 1, wherein said compound (A1) is 3,9-bis(1,1-dimethyl-2-hydroxyethyl)-2,4,8,10-tetraoxaspriro[5.5] undecane.

5. A resin composition comprising:

a polyurethane resin obtainable from (A) a compound having an active hydrogen-containing group, containing: (A1) a compound having one spiro ring and active hydrogen-containing groups at both ends; and (A2) an aliphatic polycarbonate polyol (A2); (B) an aliphatic and/or alicyclic polyisocyanate; and (C) a chain-extending agent; and an organic solvent.

6. The resin composition according to claim 5, wherein the content of said compound (A1) is from 0.2 to 40% by weight.

7. The resin composition according to claim 5, wherein said chain-extending agent is a diamine compound.

8. The resin composition according to claim 5, wherein said compound (A1) is 3,9-bis(1,1-dimethyl-2-hydroxyethyl)-2,4,8,10-tetraoxaspriro[5.5]undecane.

9. A sheet-form article comprising a polyurethane resin obtained by a method according to claim 1.

10. The sheet-form article according to claim 9, further comprising a base material.

* * * * *